(12) United States Patent
Cerra et al.

(10) Patent No.: US 11,209,446 B2
(45) Date of Patent: Dec. 28, 2021

(54) ROTATING FOOT FOR USE WITH ROBOTIC SAMPLE PREPARATION APPARATUS

(71) Applicant: EPREP PTY LTD, Springvale (AU)

(72) Inventors: Reno Cerra, Springvale (AU); Peter Dawes, Springvale (AU)

(73) Assignee: EPREP PTY LTD, Springvale (AU)

( * ) Notice: Subject to any disclaimer, the term of this patent is extended or adjusted under 35 U.S.C. 154(b) by 348 days.

(21) Appl. No.: 16/085,289

(22) PCT Filed: Mar. 20, 2017

(86) PCT No.: PCT/AU2017/050249
§ 371 (c)(1),
(2) Date: Sep. 14, 2018

(87) PCT Pub. No.: WO2017/156597
PCT Pub. Date: Sep. 21, 2017

(65) Prior Publication Data
US 2019/0072573 A1  Mar. 7, 2019

(30) Foreign Application Priority Data

Mar. 14, 2016 (AU) ................................ 2016900951

(51) Int. Cl.
*B01L 9/00* (2006.01)
*G01N 35/00* (2006.01)
(Continued)

(52) U.S. Cl.
CPC ........ *G01N 35/0099* (2013.01); *B25J 9/1661* (2013.01); *G01N 1/28* (2013.01)

(58) Field of Classification Search
CPC ........... B01L 9/54; B01L 3/0275; B01L 3/563
(Continued)

(56) References Cited

U.S. PATENT DOCUMENTS 5,479,969 A    1/1996  Hardie et al.
5,525,298 A *  6/1996  Anami ............... G01N 35/1079
                                                              422/533
(Continued)

FOREIGN PATENT DOCUMENTS

EP           0603076 A1    6/1994

OTHER PUBLICATIONS

International Search Report dated May 8, 2017 for corresponding International Patent Application PCT/AU2017/050249 filed on Mar. 20, 2017.
(Continued)

*Primary Examiner* — Natalia Levkovich
(74) *Attorney, Agent, or Firm* — David D. Brush; Westman, Champlin & Koehler, P.A.

(57) ABSTRACT

An apparatus for use with a robotic high throughput sample preparation machine. The apparatus includes: a tool retaining portion configured to engage and disengage with a sample preparation tool, and a rotation element configured to rotate the engagement portion. Actuation of the rotation element causes the tool retaining portion to alternately engage and disengage a sample preparation tool. The tool retaining portion may be configured to engage multiple sample preparation tool types such as syringes, needles, and media-containing cartridges such as those used for solid phase extraction.

18 Claims, 6 Drawing Sheets

(51) Int. Cl.
*G01N 1/28* (2006.01)
*B25J 9/16* (2006.01)

(58) Field of Classification Search
USPC .................................. 422/564, 560; 483/900
See application file for complete search history.

(56) References Cited

U.S. PATENT DOCUMENTS 7,513,857 B2  4/2009  Gueller et al.
7,900,658 B2  3/2011  Osborne et al.

OTHER PUBLICATIONS

Written Opinion of the International Searching Authority dated May 8, 2017, for corresponding International Patent Application PCT/AU2017/050249 filed on Mar. 20, 2017.

\* cited by examiner

ROTATING FOOT FOR USE WITH ROBOTIC SAMPLE PREPARATION APPARATUS

The present application is a Section 371 National Stage Application of International Application No. PCT/AU2017/050249, filed Mar. 20, 2017, which is incorporated by reference in its entirety and published as WO 2017/156597 A1 on Sep. 21, 2017, in English.

FIELD OF THE INVENTION

The present invention relates generally to the field of instruments used in the preparation of samples for analysis of the type used in high throughput analytical laboratories. In particular, the invention relates to an operating foot for a laboratory sample preparation instrument and methods of use thereof.

BACKGROUND TO THE INVENTION

The manipulation of chemical and biological materials in a laboratory environment is typically labour intensive. The prior art provides advance in laboratory equipment design which allow for greater automation of many of these manipulation steps required to execute a sample preparation protocol. Such automation has undoubtedly increased the throughput of sample preparation and analyses, reduced the cost of manual labour in the laboratory, increased the reliability and reproducibility of sample preparation and analyses, and also protected laboratory workers from contact with potentially hazardous materials.

Preparation of a sample for subsequent analysis is one area that has not been easily susceptible to automation. Often, sample preparation involves a complex series of steps that must be executed manually by skilled technicians.

Typical of many operation processes in sample preparation include; tool pickup, vial piercing, needle guiding, and withdrawal, pickup and disposal of tool elements, moving of tool elements, pickup of sample and rotation of vials for identification and processing. Even the most skilled technician may have difficulty executing these steps accurately and in a manner that ensures consistency between tests performed on different samples of the same type. Such problems become particularly evident when the sample preparation protocol must be applied to a large number of samples. While many of such tasks are now under robotic control, a technician is often still required to connect and disconnect tools from a tool drive. The need for the intervention of a technician at certain stages of sample preparation protocol decreases the cost efficiency of the task.

Robotic laboratory instruments used for multiple tasks in sample preparation are known, such instruments typically having very complex heads requiring manual interchange in the course of executing multiple tasks. An example is found in the Chemspeed Technologies™ robot platform which requires interchange of various electronically controlled robotic tool heads to allow the machine to perform all tasks associated with a particular sample preparation protocol. A sample preparation protocol may require tool pickup, vial piercing, needle guiding and withdrawal, pickup and connection of tools, disconnection and disposal of tools, movement of tools between stations, pickup of sample and rotation of vials for identification and processing, to name a few. Simplification of the machinery required to execute these operations would be a major advantage for analytical robotic systems.

It is an aspect of the present invention to overcome or ameliorate a problem of the prior art by providing a drive head which is capable of executing multiple operations required in a sample preparation protocol but without the need to change the entire tool drive in the course of the protocol.

The discussion of documents, acts, materials, devices, articles and the like is included in this specification solely for the purpose of providing a context for the present invention. It is not suggested or represented that any or all of these matters formed part of the prior art base or were common general knowledge in the field relevant to the present invention as it existed before the priority date of each provisional claim of this application.

SUMMARY OF THE INVENTION

In a first aspect, but not necessarily the broadest aspect, the present invention provides an apparatus for use with a robotic high throughput sample preparation machine, the apparatus comprising: a tool retaining portion configured to engage and disengage with a sample preparation tool, and rotation means configured to rotate the engagement portion, wherein actuation of the rotation means causes the tool retaining portion to alternately engage and disengage a sample preparation tool.

In one embodiment of the first aspect, the tool retaining portion is configured to engage multiple sample preparation tool types.

In one embodiment of the first aspect, the tool retaining portion comprises a space configured to accept and retain a sample preparation tool therein.

In one embodiment of the first aspect, the space extends horizontally to an edge of the tool engagement portion.

In one embodiment of the first aspect, the space extends vertically through entire thickness of the tool retaining portion.

In one embodiment of the first aspect, the tool retaining portion has a horizontal axis, and the space is elongate and parallel to the horizontal axis.

In one embodiment of the first aspect, the space has a variable width being relatively wide at the edge of the tool engagement portion and relatively narrow at a point distal to the edge of the tool engagement portion.

In one embodiment of the first aspect, the space has at least in part an arcuate formation.

In one embodiment of the first aspect, the arcuate formation is configured such that upon actuation of the rotation means a sample preparation tool extending vertically through the horizontal space is not substantially moved laterally.

In one embodiment of the first aspect, the tool retaining portion having a main region and two elongate formations extending therefrom, the space between the elongate formations being configured to accept and retain a sample preparation tool.

In one embodiment of the first aspect, the rotation means comprises a shaft operably attached to the tool retaining portion.

In one embodiment of the first aspect, the apparatus is configured such that the tool retaining portion is vertically moveable.

In one embodiment of the first aspect, the apparatus is configured such that the rotation of the shaft causes rotation of the tool retaining portion, and vertical movement of the shaft causes vertical movement of the tool retaining portion.

In one embodiment of the first aspect, the tool retaining portion comprises proximity sensing means and/or contact sensing means.

In one embodiment of the first aspect, the tool retaining portion is configured to accept and retain a sample preparation tool selected from the group consisting of: an analytical syringe, an analytical syringe needle, a needle guide, a septum piercer, a medium-containing cartridge configured to attach and detach to/from an analytical syringe.

In a second aspect, the present invention provides a robotic high throughput sample preparation machine comprising the apparatus of any embodiment of the first aspect, a control system having a computer processor, a set of software instructions, one or more motors controllable in accordance with the software instructions, and a user interface configured to allow a user to create or alter the software instructions, wherein the system is configured to allow a user to establish a sample preparation protocol and to execute the protocol so as to achieve a required set of rotational and/or vertical movements of the tool retaining portion.

In a third aspect, the present invention provides a system comprising the apparatus of any embodiment of the first aspect or a robotic high throughput sample preparation machine of the second aspect in combination with a sample preparation tool selected from the group consisting of: an analytical syringe, an analytical syringe needle, a needle guide, a septum piercer, a medium-containing cartridge configured to attach and detach to/from an analytical syringe.

In one embodiment of the third aspect, the sample preparation tool(s) is/are selected from the group consisting of: an analytical syringe, an analytical syringe needle, a needle guide, a septum piercer, a medium-containing cartridge configured to attach and detach to/from an analytical syringe.

In one embodiment of the third aspect, the system comprises two sample preparation tools, wherein the two sample preparation tools are configured to be operably connected by a push-pull action In one embodiment of the third aspect, the two sample preparation tools are configured to be operably connected by male-female connection means.

In one embodiment of the third aspect, the two sample preparation tools are engaged and disengaged by vertical movement of the tool retaining portion.

In a fourth aspect, the present invention comprises a method for preparing a sample for analysis, the method comprising the steps of: providing the robotic high throughput sample preparation machine of the second aspect, providing a set of samples for analysis on or about the apparatus, providing one or more of sample preparation tools required for a sample preparation on or about the apparatus, and allowing or causing the apparatus to execute a required set of rotational and/or vertical movements of the tool retaining portion such that the tool retaining portion engages and disengages with the one or more sample preparation tools in accordance with the software instructions.

In one embodiment of the fourth aspect, the sample preparation tool(s) is/are selected from the group consisting of: an analytical syringe, an analytical syringe needle, a needle guide, a septum piercer, a medium-containing cartridge configured to attach and detach to/from an analytical syringe.

In one embodiment of the fourth aspect, the method comprises the use of two sample preparation tools, wherein the two sample preparation tools are configured to be operably connected by a push-pull action.

In one embodiment of the fourth aspect, the two sample preparation tools are configured to be operably connected by male-female connection means.

In one embodiment of the fourth aspect, the two sample preparation tools are engaged and disengaged by vertical movement of the tool retaining portion.

DETAILED DESCRIPTION OF THE INVENTION INCLUDING PREFERRED EMBODIMENTS

Figure 1:
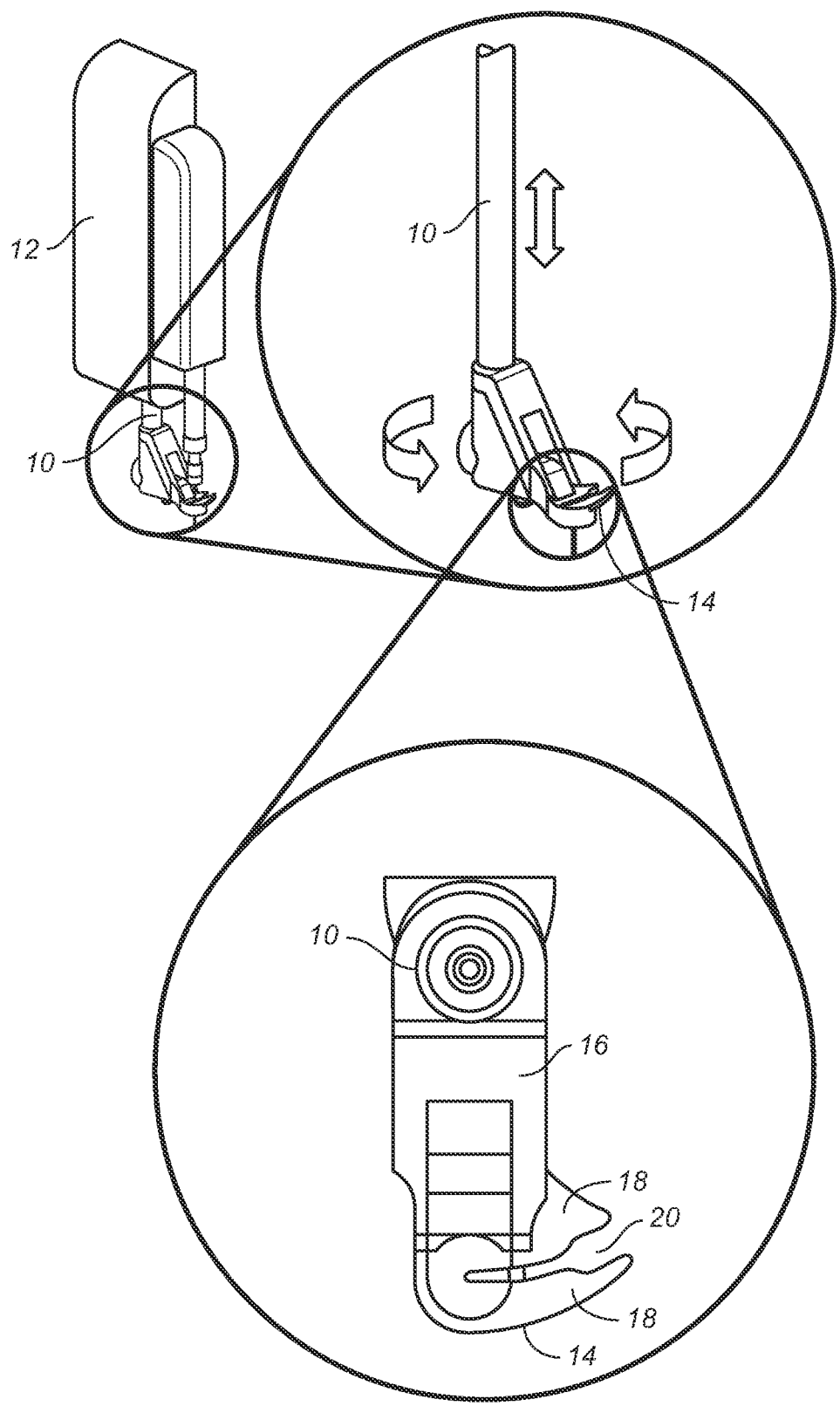
FIG. 1 is a diagrammatic representation of a highly preferred apparatus of the present invention. The circled regions are magnified portions, as indicated.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and from different embodiments, as would be understood by those in the art.

In the claims below and the description herein, any one of the terms "comprising", "comprised of" or "which comprises" is an open term that means including at least the elements/features that follow, but not excluding others. Thus, the term comprising, when used in the claims, should not be interpreted as being limitative to the means or elements or steps listed thereafter. For example, the scope of the expression a method comprising step A and step B should not be limited to methods consisting only of methods A and B. Any one of the terms "including" or "which includes" or "that includes" as used herein is also an open term that also means including at least the elements/features that follow the term, but not excluding others. Thus, "including" is synonymous with and means "comprising".

It will be understood that not all embodiments of the invention provide all advantages. Some embodiments may have a single advantage and others may have no advantage over the prior art and merely represent a useful alternative to the prior art.

The present invention is predicated at least in part on the finding that a foot the sample preparation tools used with robotic high throughput sample preparation machines can be efficiently and cost-effectively handled by the incorporation of a rotating foot into the machine. Horizontal rotation of the foot by motor means of the machine allows a sample preparation tool such a syringe to be engaged by rotating the foot clockwise, and disengaged by rotating the foot anti-clockwise while the tool is maintained stationary.

Moreover, the foot may be moved vertically so as to allow the push-pull engagement and disengagement of two sample preparation tools. For example, a medium-containing cartridge (such as a filter cartridge or an analyte capture cartridge such as the microSPE cartridge manufactured by Eprep Pty Ltd, Melbourne, Australia) may be engaged and disengaged from a syringe in the course of a sample preparation protocol. As another example, a syringe needle may be attached and detached from a syringe barrel.

As foreshadowed in the Background section, in the course of a sample preparation protocol it is typically necessary for multiple tools to be used with a tool drive of a robotic high throughput machine. Operator interference is often required to change or add a required tool, this limiting the efficiency of the machine. Some prior art machines allow for the drive to change tools without the need for an operator however many of the components involved are expensive and complex, often requiring complex air actuated or electronically actuated components. The present invention eliminates the need to change the entire tool head to achieve a specific operation during an operational sequence, and represents a significant departure from such complex prior art contrivances thereby providing an elegant and cost-effective solution to the complex problem of tool interchange.

Reference is now made to FIG. 1 which shows an apparatus of the present invention in the context of a robotic tool drive. In this preferred embodiment, a shaft 10 extends downwardly and vertically from the robotic tool drive 12. The shaft is rotatable by motor means (not shown) disposed within the tool drive, the motor means configured (whether by direct drive or gear means) so as to axially rotate the shaft 10. Typically rotation of the shaft is via a stepper motor or other motor means configured to rotate the shaft 10 in a controlled and precise manner. For example, the stepper motor may (under program instructions) rotate either clockwise or anticlockwise for a predetermine number of degrees.

The shaft 10 may be movable vertically. Typically this is achieved by a second motor means which is dedicated to that function. The second motor means may be an electric motor having a gear fixed to its shaft, the gear in operable connection with shaft 10 so as to move the shaft upwardly and downwardly. A stepper motor, worm drive or rack-and-pinion type arrangements will be operable in this regard.

The shaft 10 is fixedly connected to the tool retaining portion, which in this preferred embodiment is a plate 14 of substantially planar geometry. The plane of the plate 14 is horizontal, and parallel to a deck (not shown) of the robotic sample preparation machine of which it is a component, and orthogonal to the shaft 10 to which it is fixedly connected. Thus, axial rotation of the shaft 10 is directly translated into a strictly horizontal rotational movement of the plate 14 about the axis of the shaft 10.

The plan view of the apparatus shows more clearly the arrangement of the shaft 10 to plate 14. The shaft 10 inserts into and is fixedly connected to a joining region 16, with the plate 14 fixedly connected to the joining region 16.

Staying with the plan view, the plate 14 is divided into two opposed extending regions 18 by an elongate space 20 cut into the plate 14. It will be noted firstly that the outer length of the elongate space 20 is significantly wider than the inner length. This provides for the plate 14 to allow for entry and retention of small diameter tools (by the inner region) and also larger diameter tools (by the outer region). For example, a syringe needle may be accommodated by the inner region of the elongate space 20, and a media-containing cartridge accommodated by the outer region. Given the teachings of the instant specification, the skilled person will be amply enabled to provide other arrangements of the plate 14 capable of accepting and retaining multiple types of sample preparation tools.

It will be further noted that the elongate space 20 is curved. Preferably the curve is concentric with the shaft 10 such that upon rotation of the shaft 10 the curved centre line of the elongate space 20 remains on a line of a circle having the central axis of the shaft 10 as its centre.

Figure 2:
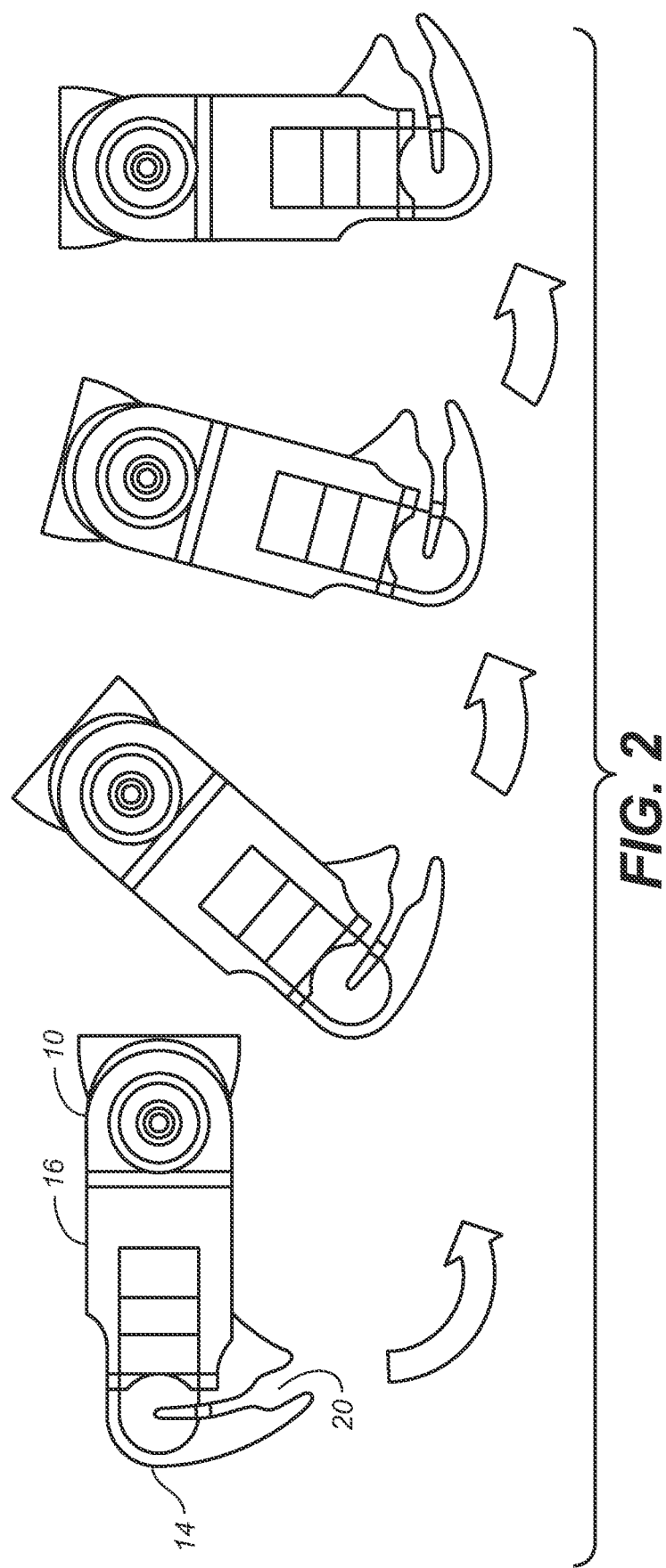
FIG. 2 is a diagrammatic representation showing in plan view the rotation of a foot subject of FIG. 1.

Reference is now made to FIG. 2 which shows (in plan view) sequential rotation of the shaft 10 through 90 degrees. It will be noted that the curved elongate space 20 sweeps about an arc, and a tool not shown) in the path in the path of the space 20 will enter the space 20 to be engaged by the plate 14. The tool may be secured by a flange of the tool which contacts either side of the plate so as to resist any vertical movement of the tool. In addition or alternatively, the apparatus may comprise dedicated securing means so as to more fully retain the tool within the space 20, preventing movement such as undesired vertical movement or undesired lateral movement. Potentially useful securing means includes an electrically actuatable clamp, a solenoid pin extending from any part of the apparatus and bearing onto or into a recess of the tool, or similar. Thus, where the protocol requires that a tool is picked up from one point on the machine deck and carried to another point, the first step is a tool engagement step as just described.

In some embodiments, the shaft may rotate at least 180 degrees, or 270 degrees or up to 360 degrees.

Upon pickup, the tool is typically conveyed by x,y transport means of the type well known in the art to another location. The location may be a reagent station, or a sample rack, or a disposal station for example. Once a tool is at a desired location, a further action of the machine may be initiated. The action may be the aspiration of a sample or reagent into to a syringe or expulsion of a sample into an analysis instrument. Another possible action is the disengagement of the tool into a tool station or a waste station. In a preferred embodiment, disengaged of the tool is performed by rotating the plate 14 in the reverse direction to that shown in FIG. 2 (by counter-rotating the shaft 10), such that the plate 14 is rotated away from the tool such that the tool is outside the confines of the space 20.

In this preferred embodiment, the plate 14 is movable vertically. The vertical movement is independent to the rotational (horizontal) movement so as to allow the plate 14 to be locatable within a three-dimensional space above the deck of the sample preparation machine. The vertical movement allows for pickup of multiple types of tool, given that the point of contact may be relatively low for one tool type and relatively high for another.

The vertical movement may also allow for the push-pull connection of two complementary tools. It is often the case in a sample preparation protocol that a cartridge of some description must be attached to a liquid delivery device (such as a syringe) so as to pass a sample through the cartridge to achieve a desired outcome. The cartridge may be a filtration cartridge configured to remove a contaminant (by molecular weight or adsorption for example) so as to leave a purified product for analysis. The cartridge may be for the purpose of selectively adsorbing soluble species onto a medium whereby the sample is passed through the cartridge and the adsorbed species being eluted from the medium upon passing an elution solution through the cartridge. The cartridge may be pushed vertically onto the syringe and then pulled vertically from the syringe. Alternatively, syringe may be pushed vertically onto the cartridge and then pulled vertically from the cartridge. As will be appreciated, for the pulling step to detach the two components, one of the components will typically be locked in position.

A push-pull connection reliant on the vertical movement may be used to attach a syringe needle to a syringe barrel, or any other two suitably coupled components.

Figure 3A:
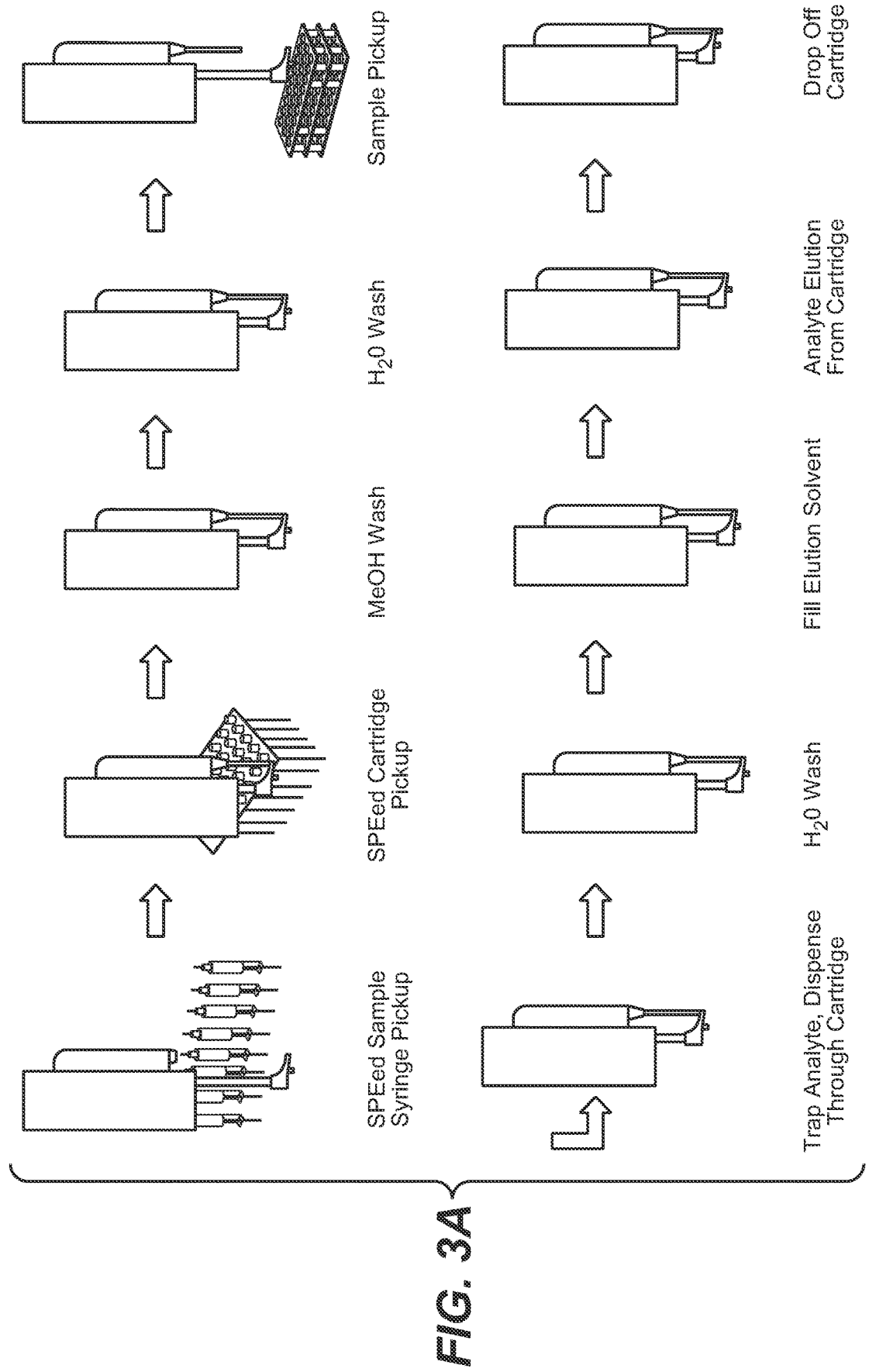
FIG. 3A shows an exemplary sequence in a sample preparation protocol in which the present apparatus is operable.

Reference is made to FIG. 3A which shows an exemplary sample preparation sequence including tool pickup, sample aspiration and dispensing, and micro solid phase extraction technique, this sequence being reliant on the present apparatus. In this example the rotating foot engages and disengagees with a microSPE (solid phase extraction) cartridge with a push/pull male-female connection.

Figure 3D:
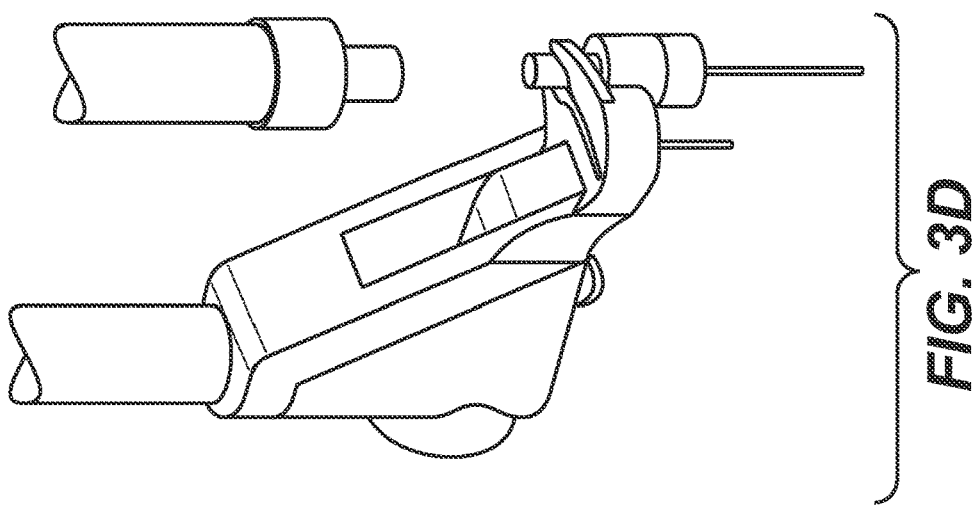
FIGS. 3B, 3C and 3D shows a sequence involving engagement and disengagement of a solid phase extraction cartridge with a syringe as required in the sample preparation protocol of FIG. 3A.
Figure 3C:
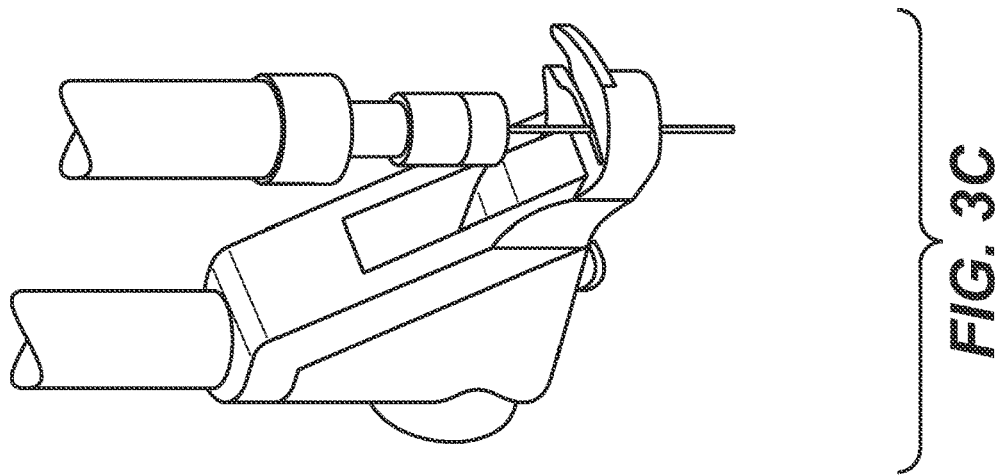
Figure 3B:
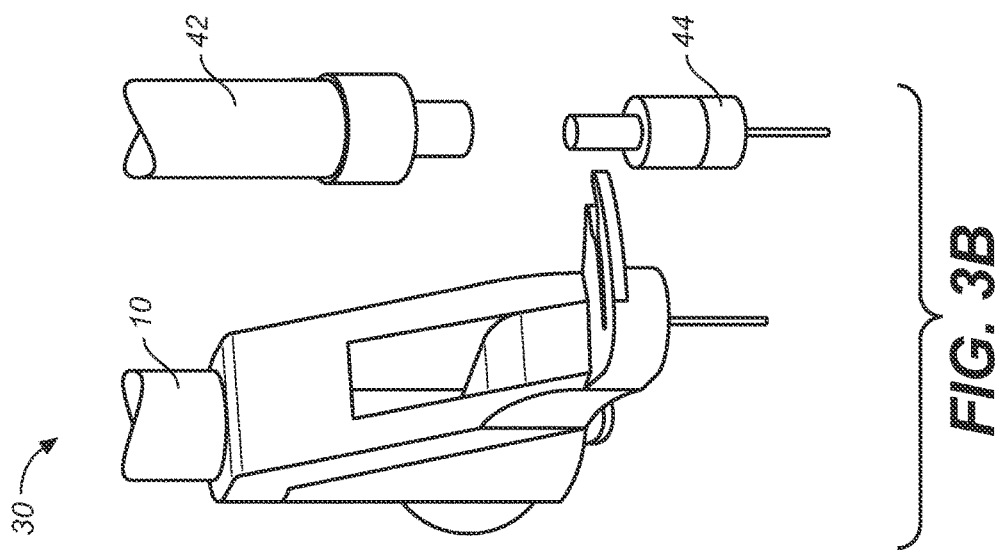

Specifics of the operation of the foot is shown in the sequential FIGS. 3B, 3C and 3D. FIG. 3B shows the foot 30 rotated away from the syringe thereby allowing the syringe 42 to engage with the microSPE cartridge 44. FIG. 3C shows the foot rotated back to engaged microSPE cartridge during sample operation. FIG. 3D Foot rotated away from syringe allowing the foot to disengage from the microSPE cartridge.

The present apparatus may be used for needle pick-up and alignment, whereby the plate is rotated onto a needle tip during tool pick-up. The needle tip and needle are retained so as to align the needle tip with the needle guide before the needle is inserted into the guide.

As another example, when engaging a gripper the plate or other tool, the engaging portion is placed at the base of the gripper for protecting tubes and bumps from obstacles, but is moved away to allow the gripping of the tube as necessary.

In other sample preparation protocols the plate or other form of tool retaining portion may be configured with splines and be fork-like being capable of holding and disposing of cartridges and filter elements. The plate or other form of tool retaining portion may be configured to lock a components onto a syringe to create a high pressure seal.

Figure 4B:
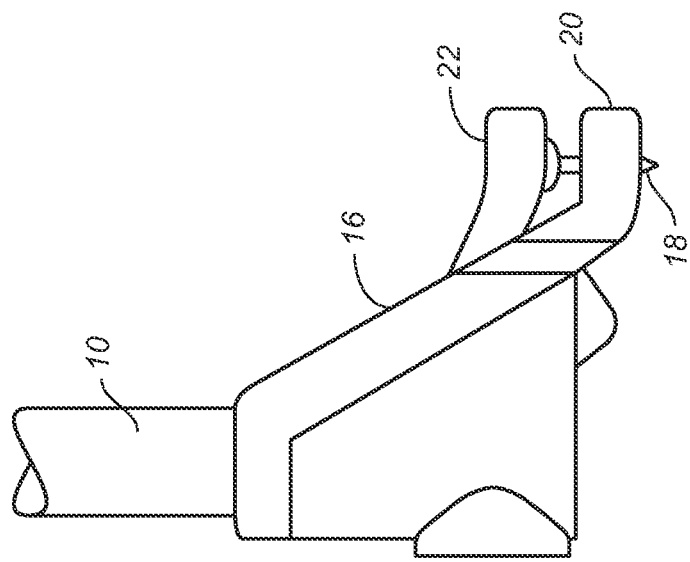
FIGS. 4A and 4B show a highly preferred apparatus of the invention comprising a two-plate foot capable of separating a needle guide and septum piercing element from a foot base plate.
Figure 4A:
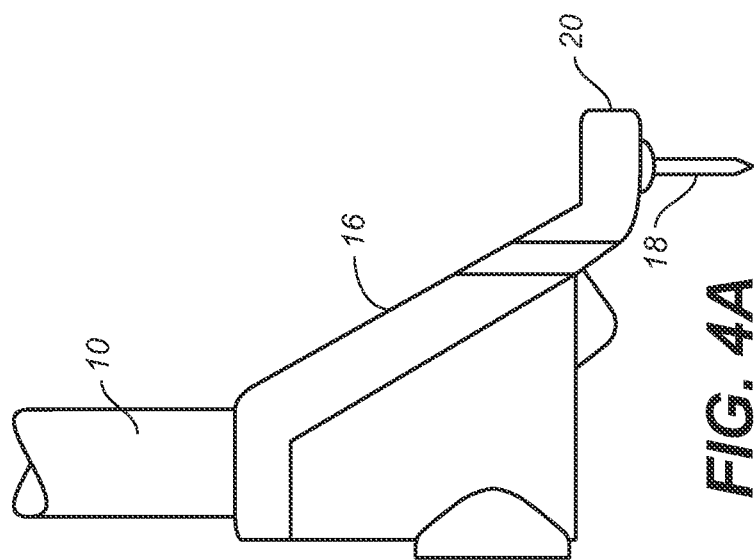

Reference is made to FIGS. 4A and 4B which show a particular embodiment of the invention configured as a two-plate foot capable of separating a needle guide and septum piercing element 18 from a foot base plate 20. FIG. 4A shows the needle guide/piercer in contact with the foot base. FIG. 4B shows separation of the needle guide/piercer from the foot base plate 20 by vertical movement of a lifter plate 22. The purpose separation of the guide and foot base plate may be to facilitate the safe movement of a needle. The foot is positioned so that the needle tip and septum piercer are retracted into the foot cavity making them safe to move. A foot bumper sensor (discussed further infra) may be triggered if the bottom of the foot touches an object or operator body part.

Moreover, the guide-piercer can be used to pre-pierce the septum ahead of the needle being passed through the septum. This enables longer needles with smaller internal diameters to be used without the risk of the needle buckling when pushed through a septum. This also reduces possibility of needle blockages.

This arrangement further assists in piercer extraction. The piercer is extracted from the septum prior to extraction of the needle so that needle can be wiped clean through the septum during extraction.

Apart from fluidly connecting two components, the plate or other form of tool retaining portion may be configured to function as a spoon useful in the scooping up and depositing of solid and semi-solid samples.

Figure 5A:
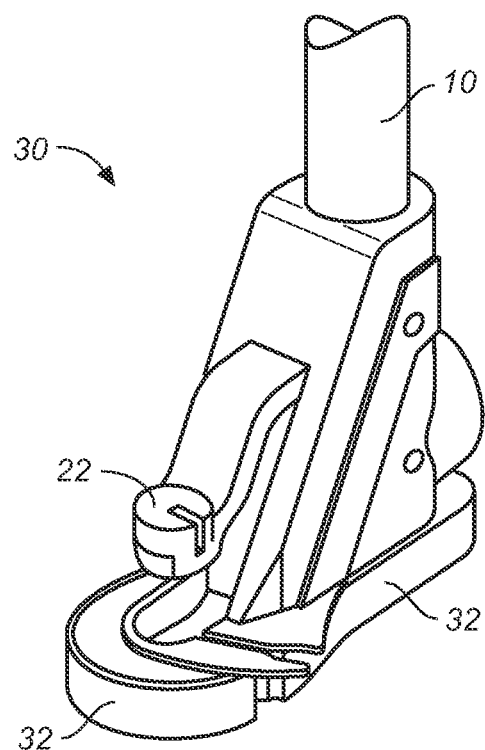
FIGS. 5A and 5B show a highly preferred apparatus of the invention having a touch sensitive peripheral bumper operative to detect collisions and map the heights of various objects on the deck of a high throughput sample preparation apparatus of which it is a component.
Figure 5B:
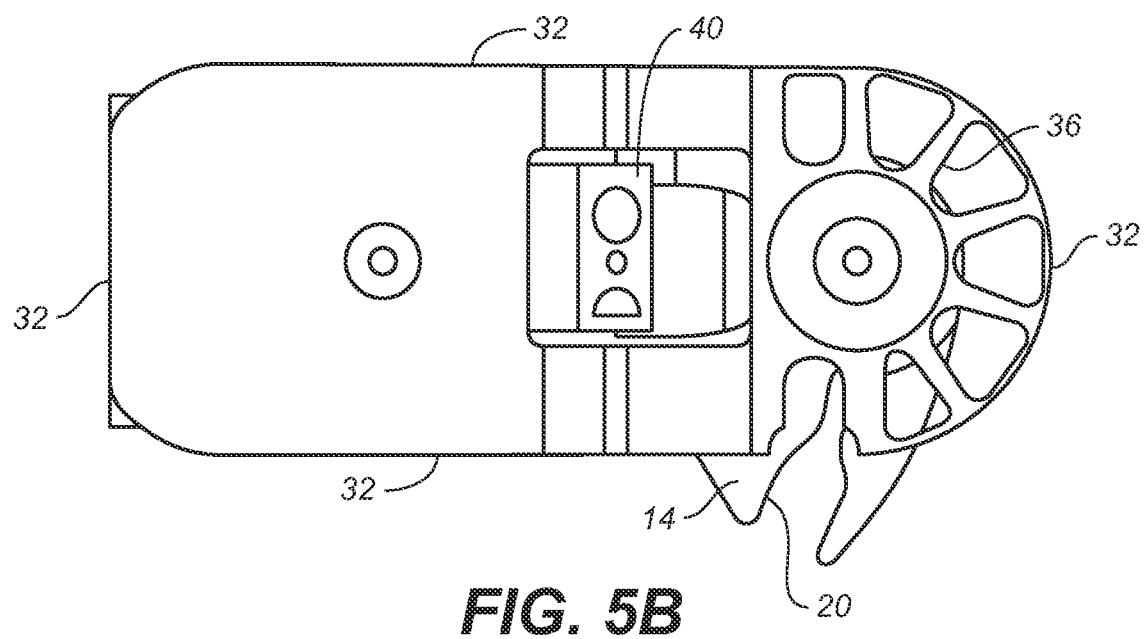

Reference in now made to FIGS. 5A and 5B which show the addition of a touch-sensitive electronic safety bumper to a two-plate foot as shown in FIG. 4. The rotating foot 30 comprises a resilient bumper 32 on the periphery of the base plate 20. The bumper is maintained a distance from the edge of the base plate 20 by way of spacers, one of which is marked 36. It will be noted that the bumper 32 does not completely encircle the foot 30. There is an interruption in the area adjacent to the space 20 so as to allow a needle or other item to laterally enter the space and all the way into the narrow inner portion of the space 20.

The bumper 32 is configured to sense contact with an object when the foot is moved laterally toward an object and also when the foot is moved vertically toward an object.

The bumper may be operable as a safety device. If bumped by an unexpected object on the deck or touched during operation, the machine will immediately cease all movements. This can spare damage to the machine or injury to a technician.

The bumper may be operable as an object height detector: The bumper may be used to 'touch off' on the top of an objects (such as a tube, tool, or rack) on the deck to determine its height. During a system calibration protocol the bumper may be caused to 'touch-off' on numerous positions on the deck with the bumper sensing the height of any objects present on the deck. In this way, a detailed map of the deck may be generated. The map may be electronically stored in memory and movements of any tools in the course of a sample preparation protocol being charted so as to avoid an undesired collision with any object.

FIG. 5B shows an infra-red sensor 40 which is disposed on the underside of the rotating foot 30. The sensor comprises an infra-red emitter and infra-red detector configured to detect underlying objects on the machine deck and assist in vial placement. The sensor may be operable so as to detect tubes in racks prior to performing any procedures on them. This prevents samples and/or reagents from potentially being dispensed to an empty tube.

The present apparatus is operable in the context of a computer-controlled high throughput robotic sample preparation machine. As is known, such machines are operable by way of application software in terms of both a user interface, typically executable on a personal computer or tablet device to allow programming of bespoke sample preparation protocols by a user. The application software of the present invention may be executable on any past, present or future operating system of a mobile communication device including Windows™, Linux™ Android™, iOS™ and the like.

The sample preparation machine may be directly under the control of the personal computer (via driver software, for example) or alternatively the protocol information is transmitted to and stored in an electronic memory of the machine. The protocol information may be executable as machine-level instructions by the machine processor.

Thus, the protocol information may include any of the unique movements of the present apparatus such as instructions for a stepper motor to rotate the shaft of the rotating foot, and the motor-driven vertical movement of the rotating foot. Prior art software instructions will be devoid of instructions for rotational and vertical movement given the present apparatus is the first to require such instructions.

Some embodiments of the invention form a computerised system comprising a user computer device and a sample preparation machine having the capabilities of a computer. Thus, the machine may comprise a processor, electronic memory, data interfaces and the like which are in operable connection with a user computer. The user and machine computers form a computer system, the system capable of executing (in associated with machine hardware) a sample preparation protocol.

The methods and systems described herein may be deployed in part or in whole through one or more processors that execute computer software, program codes, and/or instructions on a processor. The processor may be part of a server, client, network infrastructure, mobile computing platform, stationary computing platform, or other computing platform. A processor may be any kind of computational or processing device capable of executing program instructions, codes, binary instructions and the like. The processor may be or may include a signal processor, digital processor, embedded processor, microprocessor or any variant such as a coprocessor (math co-processor, graphic co-processor, communication co-processor and the like) and the like that may directly or indirectly facilitate execution of program code or program instructions stored thereon. In addition, the processor may enable execution of multiple programs, threads, and codes.

The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere.

Any processor or a mobile communication device or server may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In some embodiments, the processor may be a dual core processor, quad core processors, other chip-level multiprocessor and the like that combine two or more independent cores (called a die).

The methods and systems described herein may be deployed in part or in whole through one or more hardware components that execute software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, computers, and devices through a wired or a wireless medium, and the like. The methods, programs or codes as described herein and elsewhere may be executed by the server. In addition, other devices required for execution of methods as described in this application may be considered as a part of the infrastructure associated with the server.

The methods, program codes, calculations, algorithms, and instructions described herein may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, 4G, EVDO, mesh, or other networks types.

The methods, programs codes, calculations, algorithms and instructions described herein may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon.

The computer software, program codes, and/or instructions may be stored and/or accessed on computer readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks. Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on computers through computer executable media having a processor capable of executing program instructions stored thereon as a monolithic software structure, as standalone software modules, or as modules that employ external routines, code, services, and so forth, or any combination of these, and all such implementations may be within the scope of the present disclosure.

Furthermore, the elements depicted in any flow chart or block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a computer readable medium.

The Application software may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

The invention may be embodied in program instruction set executable on one or more computers. Such instructions sets may include any one or more of the following instruction types:

Data handling and memory operations, which may include an instruction to set a register to a fixed constant value, or copy data from a memory location to a register, or vice-versa (a machine instruction is often called move, however the term is misleading), to store the contents of a register, result of a computation, or to retrieve stored data to perform a computation on it later, or to read and write data from hardware devices.

Arithmetic and logic operations, which may include an instruction to add, subtract, multiply, or divide the values of two registers, placing the result in a register, possibly setting one or more condition codes in a status register, to perform bitwise operations, e.g., taking the conjunction and disjunction of corresponding bits in a pair of registers, taking the negation of each bit in a register, or to compare two values in registers (for example, to see if one is less, or if they are equal).

Control flow operations, which may include an instruction to branch to another location in the program and execute instructions there, conditionally branch to another location if a certain condition holds, indirectly branch to another location, or call another block of code, while saving the location of the next instruction as a point to return to.

Coprocessor instructions, which may include an instruction to load/store data to and from a coprocessor, or exchanging with CPU registers, or perform coprocessor operations.

A processor of a computer of the present system may include "complex" instructions in their instruction set. A single "complex" instruction does something that may take many instructions on other computers. Such instructions are typified by instructions that take multiple steps, control multiple functional units, or otherwise appear on a larger scale than the bulk of simple instructions implemented by the given processor. Some examples of "complex" instructions include: saving many registers on the stack at once, moving large blocks of memory, complicated integer and floating-point arithmetic (sine, cosine, square root, etc.), SIMD instructions, a single instruction performing an operation on many values in parallel, performing an atomic test-and-set instruction or other read-modify-write atomic instruction, and instructions that perform ALU operations with an operand from memory rather than a register.

An instruction may be defined according to its parts. According to more traditional architectures, an instruction includes an opcode that specifies the operation to perform, such as add contents of memory to register—and zero or more operand specifiers, which may specify registers, memory locations, or literal data. The operand specifiers may have addressing modes determining their meaning or may be in fixed fields. In very long instruction word (VLIW)

architectures, which include many microcode architectures, multiple simultaneous opcodes and operands are specified in a single instruction.

Some types of instruction sets do not have an opcode field (such as Transport Triggered Architectures (TTA) or the Forth virtual machine), only operand(s). Other unusual "0-operand" instruction sets lack any operand specifier fields, such as some stack machines including NOSC.

Conditional instructions often have a predicate field—several bits that encode the specific condition to cause the operation to be performed rather than not performed. For example, a conditional branch instruction will be executed, and the branch taken, if the condition is true, so that execution proceeds to a different part of the program, and not executed, and the branch not taken, if the condition is false, so that execution continues sequentially. Some instruction sets also have conditional moves, so that the move will be executed, and the data stored in the target location, if the condition is true, and not executed, and the target location not modified, if the condition is false. Similarly, IBM z/Architecture has a conditional store. A few instruction sets include a predicate field in every instruction; this is called branch predication.

The instructions constituting a program are rarely specified using their internal, numeric form (machine code); they may be specified using an assembly language or, more typically, may be generated from programming languages by compilers.

While the invention has been disclosed in connection with the preferred embodiments shown and described in detail, various modifications and improvements thereon will become readily apparent to those skilled in the art.

Accordingly, the spirit and scope of the present invention is not to be limited by the foregoing examples, but is to be understood in the broadest sense allowable by law.

The invention claimed is:

1. Apparatus for use with a robotic high throughput sample preparation machine, the apparatus comprising:
a tool retaining portion having first and second formations defining a space therebetween and being engageable and disengageable with a sample preparation tool, and
a rotatable portion configured to rotate the tool retaining portion,
wherein the rotatable portion is rotatable in a first direction so as to cause the tool retaining portion to rotate in the first direction and cause the sample preparation tool to enter the space and thereby be engaged by the first and second formations of the tool retaining portion, and wherein the rotatable portion is rotatable in a second direction, opposite to the first direction, so as to cause the tool retaining portion to rotate in the second direction and to cause the sample preparation tool to exit the space and thereby disengage from the first and second formations of the tool retaining portion.

2. The apparatus of claim 1 wherein the tool retaining portion is configured to engage multiple sample preparation tool types.

3. The apparatus of claim 1 wherein the space extends horizontally to an edge of the tool retaining portion.

4. The apparatus of claim 1, wherein the space extends vertically through entire thickness of the tool retaining portion.

5. The apparatus of claim 1, wherein the tool retaining portion has a horizontal axis, and the space is elongate and parallel to the horizontal axis.

6. The apparatus of claim 3, wherein the space has a variable width being relatively wide at the edge of the tool retaining portion and relatively narrow at a point distal to the edge of the tool retaining portion.

7. The apparatus of claim 1, wherein the first formation forms at least in part an arcuate formation.

8. The apparatus of claim 7, wherein the arcuate formation is configured such that upon actuation of the rotatable portion the sample preparation tool extending vertically through the horizontal space is not substantially moved laterally.

9. The apparatus of claim 1, wherein the tool retaining portion has a main region, the first and second formations are elongate and extend from the main region, the space between the elongate first and second formations being configured to accept and retain the sample preparation tool.

10. The apparatus of claim 1, wherein the rotatable portion comprises a shaft operably attached to the tool retaining portion.

11. The apparatus of claim 1, wherein the apparatus is configured such that the tool retaining portion is vertically moveable.

12. The apparatus of claim 11 wherein the apparatus is configured such that the rotation of the shaft causes rotation of the tool retaining portion, and vertical movement of the shaft causes vertical movement of the tool retaining portion.

13. The apparatus of claim 1, wherein the tool retaining portion comprises a proximity sensor and/or a contact sensor.

14. The apparatus of claim 1, wherein the tool retaining portion is configured to accept and retain a sample preparation tool selected from the group consisting of: an analytical syringe, an analytical syringe needle, a needle guide, a septum piercer, a medium-containing cartridge configured to attach and detach to/from an analytical syringe.

15. The apparatus of claim 1, forming a robotic high throughput sample preparation machine, further comprising a control system having a computer processor, a set of software instructions, one or more motors controllable in accordance with the software instructions, and a user interface configured to allow a user to create or alter the software instructions, wherein the system is configured to allow a user to establish a sample preparation protocol and to execute the protocol so as to achieve a required set of rotational and/or vertical movements of the tool retaining portion.

16. The apparatus of claim 1, further comprising the sample preparation tool, which is selected from the group consisting of: an analytical syringe, an analytical syringe needle, a needle guide, a septum piercer, a medium-containing cartridge configured to attach and detach to/from an analytical syringe.

17. The apparatus of claim 16 comprising two sample preparation tools, wherein the two sample preparation tools are configured to be operably connected by a push-pull action.

18. The apparatus of claim 17 wherein the two sample preparation tools are configured to be engaged and disengaged by vertical movement of the tool retaining portion.

* * * * *